No. 698,941.  
Patented Apr. 29, 1902.

L. C. HANNA.
BICYCLE WHEEL HUB.
(Application filed Feb. 5, 1901.)

(No Model.)  
2 Sheets—Sheet 1.

Witnesses  
Howard D. Orr.  
Geo. H. Chandlee.

Leon C. Hanna, Inventor.  
by C. A. Snow & Co.  
Attorneys

No. 698,941. Patented Apr. 29, 1902.
L. C. HANNA.
BICYCLE WHEEL HUB.
(Application filed Feb. 5, 1901.)
(No Model.) 2 Sheets—Sheet 2.
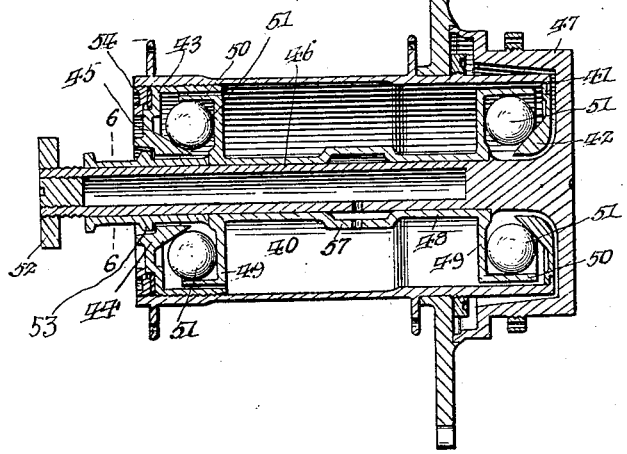
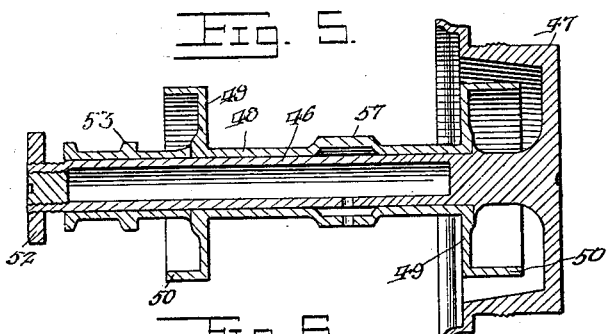
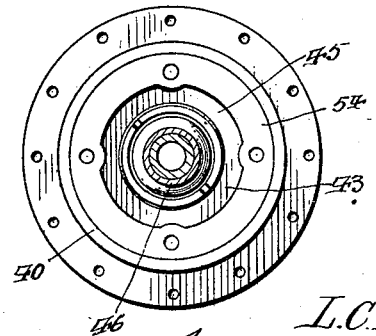
L. C. Hanna, Inventor.
Attorneys
Witnesses

UNITED STATES PATENT OFFICE.

LEON C. HANNA, OF TAMPA, FLORIDA.

BICYCLE-WHEEL HUB.

SPECIFICATION forming part of Letters Patent No. 698,941, dated April 29, 1902.

Application filed February 5, 1901. Serial No. 46,124. (No model.)

*To all whom it may concern:*

Be it known that I, LEON C. HANNA, a citizen of the United States, residing at Tampa, in the county of Hillsboro and State of Florida, have invented a new and useful Bicycle-Wheel Hub, of which the following is a specification.

This invention relates to wheel-hubs in general, and more particularly to the hubs of bicycle-wheels, the object of the invention being to provide a construction wherein the bearings will be widely separated, so that the driving-sprocket may lie between the bearings to more evenly distribute the friction between the two bearings, a further object of the invention being to provide for lubricating the bearings thoroughly and to provide a reservoir which will hold such a quantity of lubricant as not to require frequent filling.

Further objects and advantages of the invention will be evident from the following description.

Figure 1:
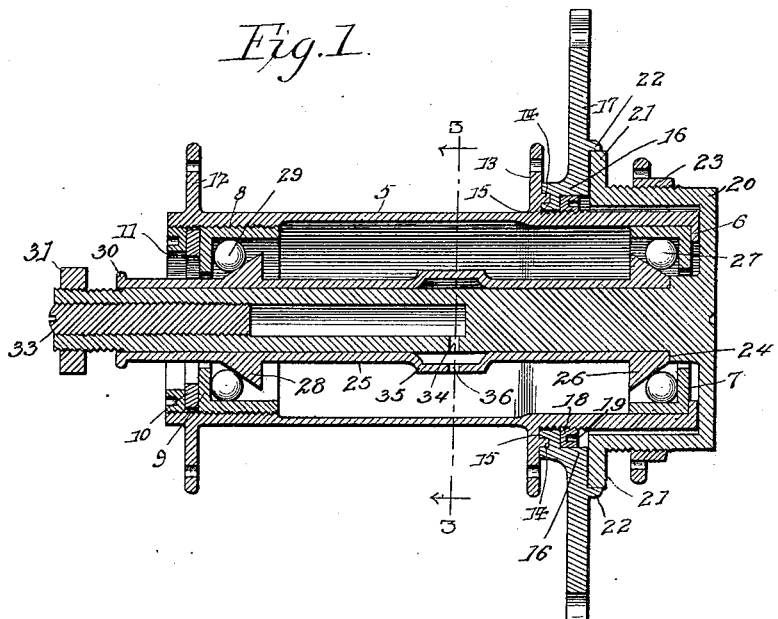
Figure 2:
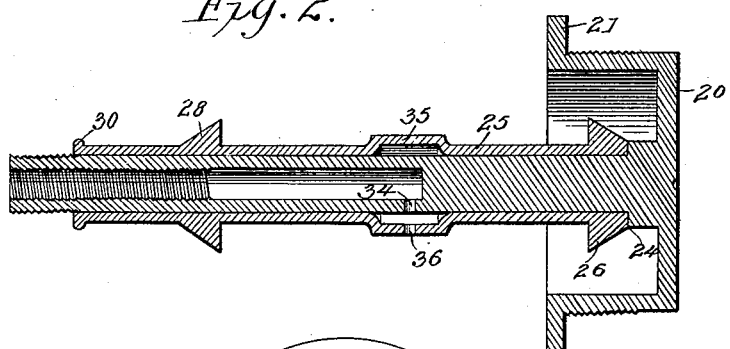
Figure 3:
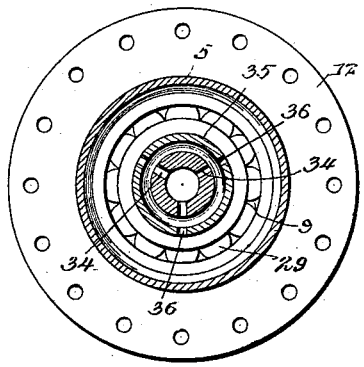

In the drawings forming a portion of this specification, and in which like numerals of reference indicate similar parts in the several views, Figure 1 is a longitudinal section taken through a hub and axle constructed and combined in accordance with the present invention. Fig. 2 is a detail longitudinal sectional view of the axle removed from the hub and with the oil-plug removed. Fig. 3 is a transverse section on line 3 3 of Fig. 1. Fig. 4 is a view similar to Fig. 1 and showing a modification. Fig. 5 is a longitudinal section showing the axle and the parts carried thereby. Fig. 6 is a section on line 6 6 of Fig. 4.

Referring now to the drawings, 5 represents the hub of a wheel, at one end of which is formed an inwardly-directed flange 6, and into the hub and against this flange there is pressed a bearing-cup 7, which is introduced through the opposite end of the hub. The opposite end of the hub from the flange 6 is provided with interior threads 8, and engaged therewith is a second bearing-cup 9, against which is clamped a washer 10 through the medium of the threaded ring or bushing 11, which is screwed into the end of the hub. The hub has two spoke-flanges 12 and 13 formed thereon, the flange 12 being near to the end into which the cup 9 is screwed, while the other flange 13 is spaced some distance from the opposite end of the hub, and on its outer face are formed lugs 14, which engage recesses 15 in the sprocket-wheel 17, disposed upon the hub. The end of the hub that carries the sprocket is threaded to receive an annular nut 18, which is adjusted to lie in a corresponding recess in the outer side of the sprocket, and which nut has recesses 19 to receive the pins of a spanner for adjusting the nut.

The axle is of a length to extend entirely through the hub of the wheel, and at one end thereof is formed a cap 20, which fits over the threaded end of the hub and has a radially-extending flange 21, which lies against the outer face of the sprocket and within the inclosure of an annular flange 22 on said outer face. The exterior surface of this cap, which is cylindrical, is screw-threaded and has a nut 23 engaged therewith. In placing the hub in the rear fork of a bicycle-frame one of the fork sides is received with its bifurcated end straddling the cap and lying between the flange of the cap and the nut 23 to hold the axle against rotation.

Adjacent to the end of the axle and within the inclosure of the cap 20 there is formed a shoulder 24, and disposed on the axle and with one end against this shoulder is a sleeve 25, having a cone 26 at its inner end, which coöperates with the cup 7 to receive bearing-balls 27. A second cone 28 is formed adjacent to the opposite end of the sleeve and in position to receive bearing-balls 29 in conjunction with the cup 9. At the end of the sleeve opposite to the cap of the axle there is formed a flange 30, beyond which the axle is threaded to receive a clamping-nut 31, and this threaded portion of the axle receives the bifurcated end of the second fork side of the bicycle-frame, so that when the nut is screwed up it will be clamped against the flanged end of the sleeve, thus holding the sleeve against rotation and assisting in holding the axle against rotation.

The minor end of the axle is hollow to receive a lubricant and is closed by a screw-plug 33, engaged therewith, and leading from the inner end of the bore of the axle are radial perforations 34, which open into an annular enlargement 35 of the sleeve, this enlargement having also radial perforations 36, which communicate with the inclosure of the hub. Thus if the axle be filled with a lubricant it may run through the several perforations to the inner wall of the hub and thence to the bearings. Furthermore, it will be noted that between the sleeve and the inner wall of the hub there is a space sufficiently large to hold a quantity of vaseline or other similar lubricant, so that one filling will suffice for a long period of use. Also with the present construction the adjustment of the cup 9 effects an adjustment of both bearings, and the sprocket-wheel is disposed so that the strain thereon will be in a plane passing between the planes of the bearings.

In practice various modifications of the specific construction shown may be made and any suitable materials and proportions may be used for the several parts without departing from the spirit of the invention.

In Figs. 4, 5, and 6 there is shown a construction including a hub 40, at one end of which is formed an inwardly-directed flange 41, and against the inner face of this flange is disposed and secured a cone 42, having a central longitudinal opening therethrough. The opposite end of the hub is interiorly threaded, and engaged therewith is a ring 43, which carries a second cone 44, connected thereto by the web 45, this second cone having also a longitudinal passage therethrough and which registers with the passage of the first cone. The axle 46 is of a length to extend entirely through the hub and at one end has a cup 47, which incloses the end of the hub. Upon the axle is disposed a sleeve 48, having flanges 49, which are themselves provided with flanges 50, which project outwardly and over the corresponding cones carried by the hub, these flanges coöperating with their respective cones to form races to receive bearing-balls 51. In some cases the sleeve 48 may be made in two sections, as illustrated. When so constructed, the rear fork of the bicycle-frame is clamped against the end of the outer section by the usual nut 52, threaded upon the end of the axle, and this outer section has a flange 53, which takes in a groove in the second or adjacent cone to prevent ingress of dust. The ring that carries the second cone is held against outward displacement by a ring 54, which is screwed against a washer disposed against the outer face of the ring. The cup 47 is disposed beneath a flange on the face of the sprocket to prevent ingress of dust, while the axle is formed hollow to receive oil, and the sleeve 48 has an enlargement 57, having an opening to supply oil to the hub, the enlargement receiving its supply of oil from the axle.

What is claimed is—

1. The combination with a hub having spoke-flanges spaced inwardly from the ends thereof, the hub adjacent to the outer face of one of the flanges being threaded, a sprocket screwed onto said threads and lying against the flange, said sprocket having a rabbet at its inner edge, a clamping-nut engaged with the threads of the hub and disposed in the rabbet to clamp the sprocket, said sprocket having also an annular flange on its outer face, and an axle disposed in the hub and having bearings between it and the hub, said axle having a cap at one end disposed over the end of the hub and having a radiating flange disposed against the outer face of the sprocket and the inner face of its flange.

2. The combination with a hub having spoke-flanges, one of said flanges having studs on its outer face, of a sprocket engaged with the hub and having recesses which receive the studs, an axle disposed through the hub and having a cap inclosing one end of the hub and having a flange at its edge lying against the sprocket, said cap being adapted to receive a fork side, a clamping-nut engaged with the cap for clamping the fork side against the flange, and bearings between the axle and hub, one of said bearings lying within the inclosure of the cap.

3. The combination with a hub of an axle passed therethrough and having a cap inclosing one end of the hub, said cap being adapted to receive a fork side and having means for clamping it thereon, said cap also having a bearing inclosed thereby, a sleeve disposed on the axle and terminating short of the end thereof opposite to the cap, a bearing between the hub and sleeve, and a clamping-nut on the axle beyond the sleeve and adapted to clamp a fork side against the end of the sleeve.

In testimony that I claim the foregoing as my own I have hereto affixed my signature in the presence of two witnesses.

LEON C. HANNA.

Witnesses:
J. C. HANNA,
JENNY OHME.